Patented Mar. 19, 1946

2,397,005

UNITED STATES PATENT OFFICE 2,397,005

GLASS ENAMEL COMPOSITION

Carl J. Harbert, Shaker Heights, and William C. Morris, South Euclid, Ohio, assignors to The Harshaw Chemical Company, Elyria, Ohio, a corporation of Ohio No Drawing. Application September 18, 1944, Serial No. 554,726

11 Claims. (Cl. 106—49)

This invention relates to low fusing enamels suitable for application to glass, and to glass articles having such enamels applied thereon. More specifically, the invention relates to lead borosilicate glazes containing rare earth fluorides.

Prior to our invention it has been known to utilize fluorides of alkali metals for the purpose of producing lead borosilicate glazes of lowered melting point and improved brilliance when pigmented with cadmium colors. The alkali metal fluorides, other factors being equal, result in lowering of the melting point and improving the brilliance of the reds (when colored with cadmium selenium pigments). But unfortunately they also result in lowering of alkali resistance and marked lowering of the acid resistance.

We have now discovered that the rare earth fluorides of the monazite group excluding cerium have the surprising effect of lowering the melting point and improving the brilliance of the reds, as in the case of the alkali metal fluorides, while lowering the acid resistance to a much smaller extent and actually increasing the alkali resistance. At the same time, the rare earth fluorides do not increase the coefficient of expansion. Titania is used for increasing acid resistance, and we find the rare earth fluorides to be quite compatible with titania, and that with titania in the melt adequate acid resistance can be retained while using very substantial quantities of the rare earth fluorides, thus obtaining low maturing temperature (640° C. and lower) together with adequate alkali and acid resistance, good fit on glass and excellent brilliance in the reds.

As above indicated, titania is used for securing acid resistance in low fusing lead borosilicate glazes while several agents have been proposed for imparting alkali resistance. Among these are zirconium dioxide as taught in U. S. Patent No. 2,278,868, barium zirconate as shown in U. S. Patent No. 2,356,316, barium stannate as shown in U. S. Patent No. 2,356,317, and rare earth oxides as shown in the copending application of Harbert, Ellinger and Morris, Serial No. 546,210, filed July 22, 1944. We have discovered that in all these cases the enamels are improved by the inclusion of rare earth fluorides derived from monazite, excluding however the fluorides of cerium. While we may, as above indicated, make use of rare earth oxides, barium stannate, barium zirconate or zirconium oxide as a "melted in" component of the glaze for imparting alkali resistance, we prefer to use the rare earth oxides for that purpose. It is possible to substitute rare earth fluorides derived from monazite, but not including cerium compounds, for the entire amount of rare earth oxides so that the rare earth fluorides serve the function of imparting alkali resistance as well as producing the softer and more brilliant glazes. We obtain our best results, however, by using some rare earth oxides and some rare earth fluorides in those cases where the rare earths are depended upon for alkali resistance. The rare earth oxides may suitably constitute from 0 to 60 per cent of the combined weight of rare earth fluorides and oxides. Again, if other agents, such as zirconium dioxide, are relied upon for alkali resistance, we may add to the mix these compounds and rare earth fluorides. As already indicated, it is not absolutely necessary to add any agent other than the rare earth fluorides for imparting alkali resistance, but we prefer to do so and thereby secure best results.

The rare earths whose fluorides are used are lanthanum, praesodymium, neodymium and thorium. Mixtures of these are suitable and, indeed, we prefer to use the mixture which we obtain from monazite when the phosphate and cerium have been removed. These rare earths may be obtained from other sources and may be used singly or in admixture. For example, didymium which is a commercially obtainable mixture of neodymium and praesodymium may be employed. Cerium is definitely harmful and should not be used deliberately, although a small amount can be tolerated and is sometimes more or less unavoidable as it is often present to some extent as an impurity in the desired materials. The preferred material because of practical considerations in obtaining it is a mixture of thorium, praesodymium, neodymium and lanthanum which is obtained by removing cerium from monazite. The mixture of these rare earths in the form of the oxides we term "monazite residue," and this mixture may be converted from the oxide to the fluoride, or partially so, by a suitable fluorination process so as to obtain variously the fluoride of the monazite residue, an oxyfluoride, or a mixture of oxides and fluorides of monazite residue. These, as a group, we term "fluorinated monazite residue." A typical example of a monazite residue suitable for our purposes would be approximately as follows:

| | Parts by weight |
|---|---|
| Thorium oxide | 9.5 |
| Praesodymium oxide | .5.0 |
| Neodymium oxide | 10.0 |
| Lanthanum oxide | 15.0 |

Such a residue would normally contain small amounts of cerium and $P_2O_5$ as impurities, but these should, for best results, be as low as practicable, cerium calculated as $CeO_2$ being kept below 1% and preferably below ½%, and phosphorus calculated as $P_2O_5$ being kept below ½%, preferably below ¼%.

Suitable composition ranges, on the analytical basis, i. e. theoretical melted composition, are as follows: Lead oxide 40 to 60 per cent, silica 22 to 32 per cent, boric oxide 3 to 12 per cent, titania 0 to 5 per cent, preferably 2 to 4 per cent, zirconia 1 to 10%, alkali oxides ($Li_2O$, $Na_2O$, $K_2O$) 3 to 7 per cent, preferably about 5 per cent, barium oxide 0 to 6 per cent, preferably 1 to 5 per cent, cadmium oxide 0 to 5 per cent, one or more rare earth oxides 0 to 10 per cent, preferably 2 to 6 per cent, and one or more rare earth fluorides 1 to 10 per cent, preferably 4 to 6 per cent. The rare earth oxy-fluorides we consider equivalent to mixtures of the oxides and fluorides of equal oxygen and fluorine content, and we intend to include them on that basis in the term "fluoride." Percentages and proportions are by weight based on the weight of the frit and exclusive of added pigments or indifferent materials.

By referring to composition ranges on the analytical basis or to melted compositions, we intend to indicate that the constituent oxides will be found on analysis in those proportions, but we do not intend to indicate the kind of physical or chemical association which may exist in the glaze itself.

In the following table, we have indicated several examples of smelter batch compositions and the resulting theoretical melted compositions.

SMELTER BATCH (PARTS BY WEIGHT)

| | Sample number | | | | | | | |
|---|---|---|---|---|---|---|---|---|
| | 1 | 2 | 3 | 4 | 5 | 6 | 7 | 8 |
| Sodium silicate [1] | 11.40 | 11.40 | 9.92 | 9.95 | 10.60 | 9.90 | 9.00 | 9.55 |
| Titansil [2] | 5.95 | 5.98 | 6.00 | 6.00 | 6.40 | 6.00 | 6.60 | 5.75 |
| Lead borate | 19.85 | 19.95 | | | 19.70 | | | |
| Lead monosilicate | 38.27 | 38.40 | 52.65 | 52.70 | 38.10 | 52.50 | 54.00 | 50.60 |
| Zinc oxide | .92 | .92 | .85 | .90 | .90 | .90 | 1.50 | .87 |
| Cadmium hydrate | 2.75 | 2.75 | 2.56 | 2.55 | 2.75 | 2.75 | 3.00 | 2.45 |
| Silica | 12.90 | 13.00 | 13.00 | 13.00 | 15.30 | 13.00 | 11.00 | 12.50 |
| Barium carbonate | 3.57 | 3.55 | 3.34 | 3.36 | 3.55 | 3.30 | 3.50 | 3.22 |
| Boric acid | | | 7.58 | 7.60 | | 7.55 | 7.00 | 7.30 |
| Zirconium dioxide | | | | | | | | 4.80 |
| Neodymium carbonate | | | | | 2.55 | | | |
| Neodymium fluoride | | | | | 2.15 | 4.10 | 2.40 | |
| Rare earth oxide (cerium free) | | | | .86 | | | 2.00 | |
| Rare earth fluoride (cerium free) | | | | 3.08 | | | | 2.96 |
| Didymium oxide | | 1.84 | | | | | | |
| Didymium fluoride | | 2.21 | | | | | | |
| Lanthanum fluoride | | | 4.10 | | | | | |
| Thorium fluoride | 4.39 | | | | | | | |

THEORETICAL MELTED COMPOSITION (PARTS BY WEIGHT)

| | 1 | 2 | 3 | 4 | 5 | 6 | 7 | 8 |
|---|---|---|---|---|---|---|---|---|
| $Na_2O$ | 4.25 | 4.28 | 4.18 | 4.18 | 4.24 | 4.18 | 4.02 | 3.92 |
| BaO | 2.82 | 2.82 | 2.75 | 2.74 | 2.66 | 2.74 | 2.88 | 2.64 |
| PbO | 49.00 | 49.30 | 47.40 | 47.60 | 49.30 | 47.30 | 48.55 | 45.60 |
| ZnO | .94 | .94 | .90 | 1.05 | .93 | .95 | 1.57 | .92 |
| CdO | 2.49 | 2.48 | 2.40 | 2.38 | 2.50 | 2.54 | 2.80 | 2.28 |
| $B_2O_3$ | 4.68 | 4.68 | 4.53 | 4.50 | 4.70 | 4.52 | 4.20 | 4.35 |
| $SiO_2$ | 29.40 | 29.40 | 31.50 | 31.40 | 29.50 | 31.40 | 29.10 | 30.25 |
| $TiO_2$ | 1.92 | 1.94 | 2.03 | 2.00 | 2.15 | 2.02 | 2.23 | 1.95 |
| $ZrO_2$ | | | | | | | | 5.07 |
| $Nd_2O_3$ | | | | | 1.91 | | | |
| $NdF_3$ | | | | | 2.21 | 4.35 | 2.53 | |
| Rare earth oxide | | | | .90 | | | 2.12 | |
| Rare earth fluoride | | | | 3.25 | | | | 3.12 |
| Didymium oxide | | 1.90 | | | | | | |
| Didymium fluoride | | 2.26 | | | | | | |
| $LaF_3$ | | | 4.31 | | | | | |
| $ThF_4$ | 4.5 | | | | | | | |

[1] $Na_2O$—25%; $SiO_2$—75%, by weight.
[2] $TiO_2$—32%; $SiO_2$—24%; $Na_2O$—25%; $CO_2$—19%, by weight.

By the terms "rare earth oxide" or "rare earth fluoride" as used in the above table, we mean a mixture of the oxides or fluorides respectively of thorium, praesodymium, neodymium and lanthanum in approximately the proportions in which they occur in monazite.

These examples are merely representative of many compositions possible according to the invention. Lead borosilicate is the fundamental basis of the enamel which may contain various proportions of the oxides of lead, sodium, barium, boron and silicon according to desired maturing temperature, coefficient of expansion, etc., all of which is understood by persons skilled in the art. Titania functions to improve acid resistance, the amount not being critical. If acid resistance is not essential, titania can be omitted. Cadmium oxide is present in these examples to condition the frit for use of a cadmium color to be introduced as a mill addition.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the examples, melt it to a clear melt, frit it into water and then grind the frit with the pigment and other usual mill additions. It is possible, of course, to add some pigments in the batch, that is, as smelter additions, but we prefer to add them at the mill. The pigment selected should be such that when the enamel is applied to glass and fused on the pigment particles do not melt. Thus the preferred enamel consists of pigment particles dispersed in a melted glaze matrix of the compositions indicated above.

Having thus described our invention, what we claim is:

1. A lead borosilicate glaze composition suitable for decorating glassware, having a fusing temperature not higher than 640° C. and comprising a lead borosilicate type of glaze composition containing a material of the class consisting of the fluorides of thorium, praesodymium, neodymium and lanthanum and mixtures thereof.

2. A lead borosilicate glaze composition suitable for decorating glassware, having a fusing temperature not higher than 640° C. and comprising a lead borosilicate type of glaze composition and containing a material of the class consisting of the oxides of thorium, praesodymium, neodymium and lanthanum and mixtures thereof and also containing a material of the class consisting of the fluorides of thorium, praesodymium, neodymium and lanthanum and mixtures thereof.

3. A lead borosilicate glaze suitable for decorating glassware, having a fusing temperature not higher than 640° C. and comprising a pigment dispersed in a glaze matrix of lead borosilicate type and said matrix containing as a smelted in addition a material of the class consisting of the fluorides of thorium, praesodymium, neodymium and lanthanum, and mixtures thereof, in proportion from 1% to 10% by weight.

4. A glass article having at least a portion of its surface coated with the glaze defined in claim 1.

5. A glass article having at least a portion of its surface coated with the glaze defined in claim 2.

6. A glass article having at least a portion of its surface coated with the glaze defined in claim 3.

7. A lead borosilicate glaze of low melting point suitable for application to glass and comprising a pigment and a melted glaze matrix, said matrix being on the analytical basis composed of the following oxides in approximately the proportions indicated:

| | Per cent |
|---|---|
| PbO | 40 to 60 |
| $Na_2O+K_2O+Li_2O$ | 3 to 7 |
| BaO | 0 to 6 |
| $SiO_2$ | 22 to 32 |
| $B_2O_3$ | 3 to 12 |
| $TiO_2$ | 0 to 5 |
| Fluorinated monazite residue | 1 to 10 |

8. A glass article having at least a portion of its surface coated with the glaze defined in claim 7.

9. A lead borosilicate glaze of low melting point suitable for application to glass and comprising a pigment and a melted glaze matrix, said matrix being on the analytical basis composed of the following oxides in approximately the proportions indicated:

| | Per cent |
|---|---|
| PbO | 40 to 60 |
| $Na_2O+K_2O+Li_2O$ | 3 to 7 |
| BaO | 0 to 6 |
| $SiO_2$ | 22 to 32 |
| $B_2O_3$ | 3 to 12 |
| $TiO_2$ | 0 to 5 |
| $ZrO_2$ | 1 to 10 |
| Fluorinated monazite residue | 1 to 10 |

10. A lead borosilicate glaze suitable for decorating glassware, having a fusing temperature not higher than 640° C. and comprising a pigment dispersed in a glaze matrix of lead borosilicate type and said matrix containing as a smelted in addition from 1% to 10% of a mixture of the fluorides of lanthanum, thorium, praesodymium and neodymium in approximately the proportions in which they occur in monazite.

11. A lead borosilicate glaze suitable for decorating glassware, having a fusing temperature not higher than 640° C. and comprising a pigment dispersed in a glaze matrix of lead borosilicate type and said matrix containing as a smelted in addition from 2% to 6% of a mixture of the fluorides of lanthanum, thorium, praesodymium and neodymium in approximately the proportions in which they occur in monazite.

CARL J. HARBERT.
WILLIAM C. MORRIS.